US008869021B2

(12) United States Patent
Wolfston, Jr. et al.

(10) Patent No.: US 8,869,021 B2
(45) Date of Patent: Oct. 21, 2014

(54) METHOD AND APPARATUS FOR PERSONALIZING COMPLETION OF ELECTRONIC FORMS

(75) Inventors: James H. Wolfston, Jr., West Linn, OR (US); Michael D. Hitchcock, Portland, OR (US); David M. Fogarty, Portland, OR (US); Michael W. Ratliff, Portland, OR (US)

(73) Assignee: Collegenet, Inc., Portland, OR (US)

( * ) Notice: Subject to any disclaimer, the term of this patent is extended or adjusted under 35 U.S.C. 154(b) by 0 days.

(21) Appl. No.: 10/890,881

(22) Filed: Jul. 14, 2004

(65) Prior Publication Data

US 2005/0060280 A1    Mar. 17, 2005

Related U.S. Application Data

(62) Division of application No. 09/455,109, filed on Dec. 6, 1999, now abandoned.

(60) Provisional application No. 60/111,203, filed on Dec. 7, 1998.

(51) Int. Cl.
*G06F 17/00* (2006.01)
*G06F 17/24* (2006.01)
*G06F 17/30* (2006.01)

(52) U.S. Cl.
CPC ........ *G06F 17/243* (2013.01); *G06F 17/30873* (2013.01)
USPC ............................ 715/221; 715/205; 715/204

(58) Field of Classification Search
USPC .............. 715/513, 500, 501.1, 505–506, 205, 715/221, 222, 224, 234
See application file for complete search history.

(56) References Cited

U.S. PATENT DOCUMENTS

| 5,446,891 | A | * | 8/1995 | Kaplan et al. ........................ 1/1 |
| 5,572,643 | A |   | 11/1996 | Judson |
| 5,706,434 | A |   | 1/1998 | Kremen et al. |
| 5,749,081 | A | * | 5/1998 | Whiteis ................................ 1/1 |
| 5,758,126 | A | * | 5/1998 | Daniels et al. ................. 715/780 |
| 5,774,887 | A | * | 6/1998 | Wolff et al. ........................ 707/1 |
| 5,913,029 | A | * | 6/1999 | Shostak ........................ 709/203 |

(Continued)

OTHER PUBLICATIONS

"Center for Matalloenzyme Studies : Summer Undergraduate Research Program" (hereinafter SURP), http://www.uga.edu/cms/SURP.html, pp. 1-18, copyright Mar. 1, 1998.*

*Primary Examiner* — Thu Huynh
(74) *Attorney, Agent, or Firm* — Scheinberg & Associates, PC; John B. Kelly

(57) ABSTRACT

The invention is a method and apparatus for encouraging applicants or others completing electronic forms to complete the forms and to become associated with the institution to which the form is directed. While completing the form or afterward, the applicant follows a hyperlink that presents a personal communication from an identified individual associated with the institution. The communication typically relates to the underlying purpose of the form rather than providing instructions on completing the form. For example, the communication may include a personalized message encouraging the applicant to attend the university. By varying the communication depending on the information entered onto the form by the applicant, the communication can be tailored to the specific background and interests of the applicant. The communication can also vary depending upon the applicants progress in the application process, for example, upon submission of verifiable payment information identifying the applicant, the applicant may be provided contact information to contact the identified individual.

21 Claims, 12 Drawing Sheets

(56) References Cited

U.S. PATENT DOCUMENTS

| | | | | |
|---|---|---|---|---|
| 5,940,812 A | * | 8/1999 | Tengel et al. | 705/38 |
| 5,954,510 A | * | 9/1999 | Merrill et al. | 434/236 |
| 5,963,952 A | * | 10/1999 | Smith | 707/102 |
| 5,978,648 A | * | 11/1999 | George et al. | 434/362 |
| 5,995,943 A | * | 11/1999 | Bull et al. | 705/14.39 |
| 6,029,141 A | * | 2/2000 | Bezos et al. | 705/27 |
| 6,122,647 A | * | 9/2000 | Horowitz et al. | 715/205 |
| 6,185,586 B1 | * | 2/2001 | Judson | 715/513 |
| 6,192,381 B1 | * | 2/2001 | Stiegemeier et al. | 715/505 |
| 6,201,948 B1 | * | 3/2001 | Cook et al. | 434/350 |
| 6,216,164 B1 | * | 4/2001 | Zaremba, Jr. | 709/227 |
| 6,226,642 B1 | * | 5/2001 | Beranek et al. | 707/10 |
| 6,249,291 B1 | * | 6/2001 | Popp et al. | 345/473 |
| 6,266,649 B1 | * | 7/2001 | Linden et al. | 705/7.29 |
| 6,345,278 B1 | | 2/2002 | Hitchcock et al. | |
| 6,448,981 B1 | * | 9/2002 | Kaczmarski | 715/763 |
| 6,615,226 B1 | * | 9/2003 | Hartman et al. | 715/505 |
| 6,704,906 B1 | * | 3/2004 | Yankovich et al. | 715/505 |
| 2003/0145018 A1 | * | 7/2003 | Hitchcock et al. | 707/104.1 |

* cited by examiner

58

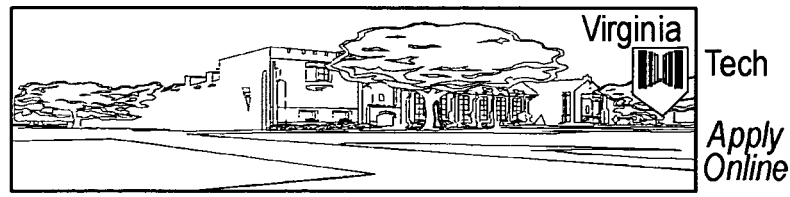

Virginia Tech
Freshman Application for Admission
Fee: $0.00

Contents

- Biographical Information
- High School Information
- College Information
- Family Information
- Extracurricular Activities
- Statements Are you applying as a:
- Freshman Early Decision (application deadline, November 1)
- Freshman (fewer than 12 college credits attempted)

Biographical Information

Social Security #: ☐ ☐ ☐  ← 60  ← 60
*Last/Family Name:* First: Middle: ☐ ▼
Preferred name or nickname: ☐ ← 60
Any other names you are or have been known by:
Date of birth (MMDDYY): ☐ ☐ ☐

Mailing Address:
Street: ☐  Box/Apt: ☐  City: ☐
State/Province: ☐ ▼  Zip/Postal code: ☐

*FIG. 3A*

E-mail address: [ ]  ⟵ 58
Permanent Address:
Street: [ ] Box/Apt: [ ]   ⟵ 60a    ⟵ 64
City: [Boston] State/Province: [Massachusetts ▼]
Country (view codes): [ ] Zip/Postal Code: [ ]
Home Phone: [ ] Work Phone: [ ]

Gender: • Male  • Female
Do you request campus housing?  • Yes  • No
Do you wish to register as a cadet?  • Yes  • No
If yes:  • Cadet only  • Cadet (Army ROTC)  • Cadet (Navy ROTC)  • Cadet (Air Force)
 • Cadet (Marine ROTC) Ethnic Origin: [ ▼]

Planned Entrance Term: [ ▼]

○
High School Information

| High School | CEEB Code | City, State | Begin Date (MMYY) | End Date (MMYY) |
|---|---|---|---|---|
| | | | | |
| | | | | |
| | | | | |

If you have been recognized by the National Merit Scholarship Corporation (NMSC), Please check the applicable box below:
■ Nat'l Merit Semifinalist
■ Nat'l Merit Commended
■ Nat'l Achievement Semifinalist
■ Nat'l Achievement Commended
■ Nat'l Hispanic Semifinalist
■ Nat'l Hispanic Commended ○
College Information

*FIG. 3B*

| College | CEEB Code | City, State | Credits Earned | Sem./Qtr. Completed | GPA | From (MM/Y |
|---|---|---|---|---|---|---|
| | | | | | | |
| | | | | | | |
| | | | | | | |
| | | | | | | |
| | | | | | | |
| | | | | | | |
| | | | | | | |
| | | | | | | |

⟵ 58

Freshman: Select your first choice major.
If you are requesting Engineering, list General Engineering (GE) as your first choice: specific majors within Engineering are available for upperclassmen and transfer students only.
If you are requesting a major in Agriculture and Life Sciences, Business, or Human Resources, select a major noted by a double asterisk (**).
If you are undecided about both a college and a major, select University Studies (US) as a first choice.
If you are applying to a restricted major, or if attending Virginia Tech is as Important to you as your major choice, it is recommended that you check "Consider for US as a secondary choice" in addition to your first choice major.
Being considered for US gives you a second option if space or competition prevents an offer in your first choice.

Students interested in pre-professional preparation in areas such as medicine, dentistry, veterinary medicine, law, physical therapy, and pharmacy may choose any major in any college, and may arrange to work with the appropriate pre-professional advisor to prepare for application and admission to the professional school of their choice.  ⟵ 60b Requested Major: [          ▼]
Consider University Studies (US) as a second choice? • yes  • no In addition to the specific major selected above, indicate if you are interested in one of the following pre-professional programs OR teacher certification:  • Pre-Dentistry  • Pre-Medicine
• Pre-Veterinary  • Pre-Law  • Pre-Physical Therapy  • Pre-Pharmacy
• Teacher Certification K-5  • Teacher Certification 4-8  • Teacher Certification Secondary
• NONE

**Applications accepted from incoming freshmen only; transfers may not choose these majors.
$Applications accepted from transfer students only; freshman may not choose these majors.
*Restricted major or one for which demand far exceeds available space. Choosing University Studies

*FIG. 3C* as a second choice will increase the chances of receiving an offer of admission to the university (freshmen only).
++A master's degree and teaching certification is earned in the fifth year.
@Students are admitted in fall semesters only.
+Portfolio/Audition required.
@@Education/Teaching option offered.

Family Information

Father/Guardian Last/Family Name: [ ] First [ ] Middle: [ ]
Street: [ ]
City: [ ] State/Province: [ ] Zip/PostalCode: [ ]
Work Phone [ ] Home Phone [ ]
Is this person your legal guardian: • Yes  • No
Living:  • Yes  • No
Occupation/Title: [ ]
Employer: [ ]
Employer's City/State/Zip [ ]
College(s) Attended: [ ]

Mother/Guardian Last/Family Name: [ ] First [ ] Middle: [ ]
Street: [ ]
City: [ ] State/Province: [ ] Zip/PostalCode: [ ]
Work Phone [ ] Home Phone [ ]
Is this person your legal guardian: • Yes  • No
Living:  • Yes  • No
Occupation/Title: [ ]
Employer: [ ]
Employer's City/State/Zip [ ]
College(s) Attended: [ ]
If not living with both parents, with whom do you reside? [ ]

Birthplace (City, State, Country)[view codes]: [ ], [ ], [ ]
What country are you a citizen of? [view codes]: [ ]
Are you a permanent resident (resident alien) of the U.S.? • Yes  • No
If non-resident alien, what type of visa do you hold? [ ]
Draft Registration# (males only): [ ]
Language(s) spoken at home: [ ]

*FIG. 3D*

Relatives who have attended Virginia Tech (name, relation, dates attended/Grad Yr.):

[text area]

Have you ever been suspended, expelled, dismissed, or subject to disciplinary action from any school?
• Yes  • No
Please give a full explanation for any expulsions, suspension, dismissal, or disciplinary action at a previous school:

[text area]

Have you ever been convicted of a violation of any state or federal law, other than a minor traffic violation?  • Yes  • No
Please give a full explanation for any past criminal convictions:

[text area]

○
Extracurricular Activities

| Activity | Type | School year or Post-secondary (PS) | | | | | Approximate time spent | | Positions held, honors won, or letters earned | Do you plan to participate in college |
|---|---|---|---|---|---|---|---|---|---|---|
| | | 9 | 10 | 11 | 12 | PS | Hours per week | Hours per year | | |
| | ▼ | ☒ | ☒ | ☒ | ☒ | ☒ | | | | • Yes<br>• No |
| | ▼ | ☒ | ☒ | ☒ | ☒ | ☒ | | | | • Yes<br>• No |
| | ▼ | ☒ | ☒ | ☒ | ☒ | ☒ | | | | • Yes |

*FIG. 3E*

Statements

Freshman applicants (OPTIONAL): Use this space to tell the Admissions Committee something about yourself, your achievements to date, and your goals for the future. If there is something that has affected your academic performance in a negative way and requires an explanation, please take this opportunity to explain.
Transfer applicants (MANDATORY): Please describe your reasons for leaving your present or most recently attended college or university and for wanting to attend Virginia Tech. Be sure to name your present or most recently attended school in your statement.

FIG. 3F

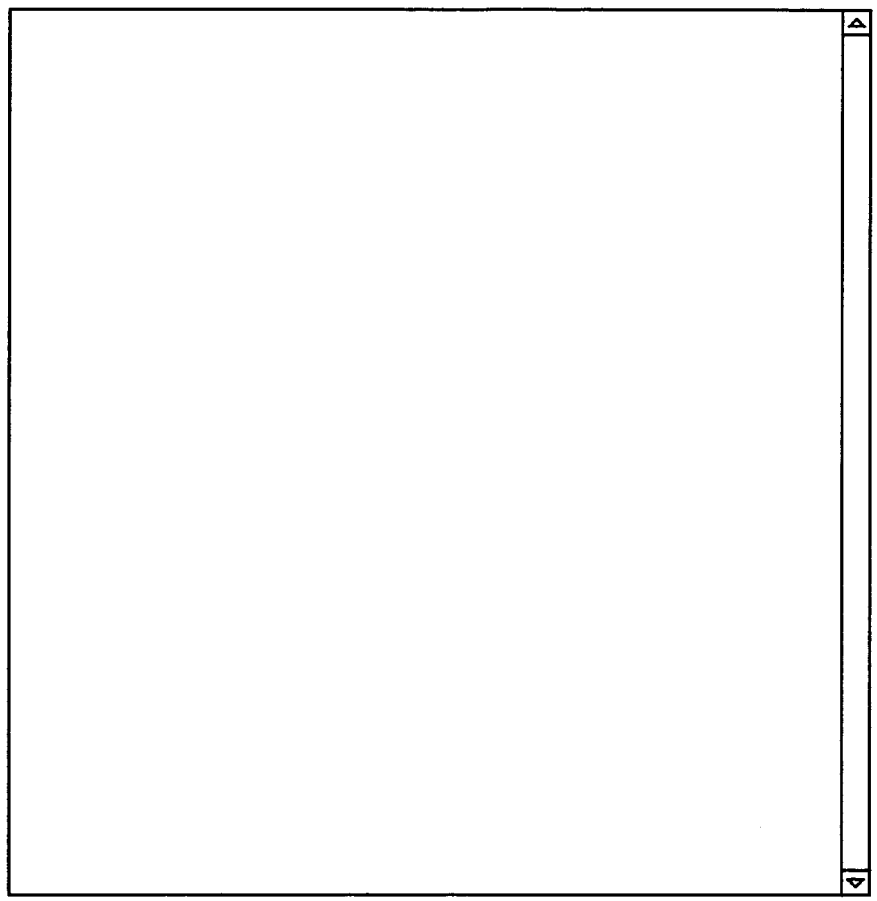

FRESHMAN EARLY DECISION APPLICANTS ONLY
I have checked the Freshman Early Decision box at the top of this application and I have applied to only one school under the Early Decision Plan.
• Yes  • No   Date: (MMDDYY) ☐ ☐ ☐

I certify that all information given on this application is true and correct. I will abide by all rules and regulations of the university. I will accept the responsibility of the Honor Code of the university. I pledge I will not lie, cheat of steal. I understand that violation of the Virginia Tech Honor Code May result in severe penalties, including dismissal from the university.
• Yes  • No   Date: (MMDDYYYY) ☐ ☐ ☐

[Save This Page]  [Finish Session]
[Save, Pay, and Send]

*FIG. 3G*

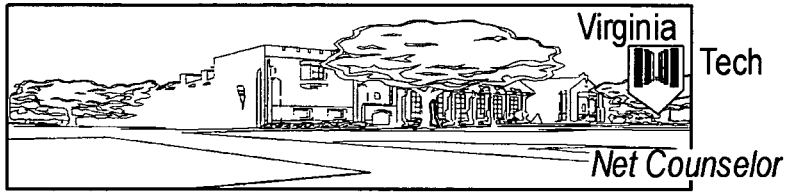

Susan

As a National Merit Scholar from Boston, I had lots of choices for college. So why did I end up studying here at Virginia Tech? Dare I mention that the weather is a whole lot warmer in Blacksburg than in Boston Not only is this a great university--one of the US Research 1's, it's a beautiful, safe, clean place. And springtime in Blacksburg is a garden. I guess I feel like I'm home even though I'm not. And as wired as this town is, I can connect to anywhere or anyone anytime I need to.

Once you complete and submit your app, look for my complete netcounselor homepage under "Susan" in the netcouncelor section of your personal log. You can email me from there with any questions about a Bostonian's life in Blacksburg!

*FIG. 4*

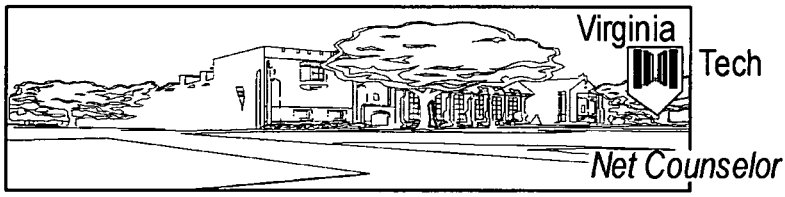

Damon

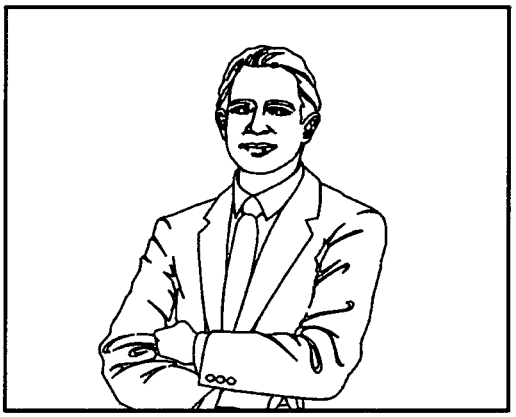

Chicago to Blacksburg? You got it! And it's great. I grew up in Melrose Park, and then I lived in Naperville. Still have a lot of friends back home. Many of them have visited me here. They love the mountains and the people. I love the athletic facilities, and the room to bike and run. I like the mix of being far enough away from home in a place that is calmer, more conducive to study, and safer. I feel like I've gotten to know a different way of thinking and living here in Blacksburg.

I enjoy introducing other chicagoans to Virginia Tech. Once you've completed and submitted your app, click on "Damon" in Netcounselors from your personal log. From there, send me an email and we'll trade stories. Looking forward to meeting you!

FIG. 5

METHOD AND APPARATUS FOR PERSONALIZING COMPLETION OF ELECTRONIC FORMS

RELATED APPLICATIONS

This application is a divisional of U.S. patent application Ser. No. 09/455,109 filed Dec. 6, 1999, which claims priority from U.S. Provisional Patent Application No. 60/111,203, filed Dec. 7, 1998. Both parent applications are hereby incorporated by reference.

TECHNICAL FIELD OF THE INVENTION

The invention relates to electronic forms and, in particular, to encouraging the completion of electronic forms by making the forms-completion process a more social, less solitary activity

BACKGROUND OF THE INVENTION

Filling out forms is typically impersonal drudgery. Although the Universal Forms Engine described in U.S. Pat. No. 6,345,278 reduces the drudgery by automatically completing parts of an electronic form using information that was previously entered and stored, completing forms is still a solitary and impersonal activity. The help and encouragement one gets, in any, for completing any for—tax form, admissions application form, job application, etc.—comes only in the form of a direct mentor (e.g., telephoning or taking your tax form to the IRS help office or to your CPA) or in the form of written instructions.

If an organization sponsoring a form wants to personalize the forms completion process to encourage users to complete its forms, that organization must hire counselors to directly assist the applicant, either by telephone or in person. This method of providing support and encouragement, however, is very expensive. Moreover, it is necessary to coordinate the work schedule of the counselors with the anticipated timing of the requests for help from the users. Such coordination is imperfect at best and can result in excess labor costs during some periods and long waits for help at other times. Also, such counselors are typically assigned at random to users and cannot be readily matched to each individual user asking for assistance.

The seemingly inherent impersonalization and drudgery attendant to the process of filling out forms is particularly problematic for an institution, such as a college or university or an employer, that competes for qualified applicants. In the case of colleges, millions of dollars are spent to recruit and encourage students to apply, only to then place them into an application process that is impersonal drudgery and that can discourage them from completing the application. The efforts of the institution to encourage someone to join are simply belied by the process.

SUMMARY OF THE INVENTION

An object of the invention is to personalize the forms completion process, thereby encouraging users to complete and submit forms.

Another object of the invention is to provide during the forms completion process personal communications to an applicant from an appropriate mentor.

Still another object of the invention is to provide a supportive community or team for a person completing a form.

Yet another object of the invention is to provide an incentive for individuals to complete and submit forms they have begun.

Still a further object of the invention is to encourage the completion of forms by making the forms-completion process a more social, less solitary activity.

The present invention provides a method and apparatus for encouraging the completion of forms over a computer network. In accordance with the present invention, a form including multiple data entry fields is presented to a user over a computer network from an institution. To complete the form, the user enters information into the data entry fields. While completing the form, a communication is presented to the user from an identified person associated with the institution.

The communication typically includes biographical information about the identified person, a message of encouragement, and an invitation to contact the identified person after completing the form. The communication occurs, for example, when the user clicks on a hyperlink on the form. The communication may vary, for example, depending upon information entered onto the form by the user, or the same communication may be presented to all users. The communication may be, for example, a pre-composed Web page, or the communication may be composed in response to information entered on the form. The identified person is preferably a real individual, thereby providing a human, social element to the otherwise solitary activity of completing the form. This social element can have the effect of increasing the goodwill the user feels toward the institution, thereby encouraging the user to enter into a relationship with the institution.

For example, in a college admissions application, a data entry field may be labeled "Major Field of Study." By the field is positioned an icon showing, for example, a stylized image of a person. Upon clinking the icon, a message may appear from a student already enrolled and studying in the field entered by the applicant. The message may include a still or motion image of the enrolled student, information about the academic department offering the field of study, and an invitation to the applicant to contact the enrolled student upon completion of the application.

With the present invention, the application process is fun, personalized, interesting (not drudgery), and has a human face. The application form is transformed into a "Human-Form." The process is now consistent with the marketing objectives of the institution: encouraging and mentoring people to join their community.

The invention can be implemented in conjunction with the NetCounselor™ system, described in U.S. patent application Ser. No. 09/410,649, which is hereby incorporated by reference and which is assigned to the assignee of the present invention. In a preferred Net Counselor system, enrolled students selected by an institution are provided with an electronic form, which allows the enrolled student to create a personal page in a computer database that is accessible through a computer network, such as the Internet, to prospective students. The enrolled student describes himself and his interests and activities on the personal page. The enrolled students may also select graphics and various decorations so that the page is personalized to the enrolled student.

A prospective student wanting to identify and contact enrolled students having interests similar to his own can search the NetCounselor database. The prospective student is provided with a search form that allows him to specify search criteria for many of the fields contained in the enrolled students' personal pages in the NetCounselor system. Upon locating an enrolled student that the prospective student wishes to contact, the prospective student may contact the enrolled student, preferably through the system. Thus, the enrolled student does not provide his personal e-mail address or other information that he does not desire to make public.

With the present invention, the NetCounselor system may be integrated more directly into an application form. A complete or partial NetCounselor profile or a message from an appropriate Net Counselor may be presented to an applicant without the applicant leaving the application form or initiating a search. The presentation may be initiated by an applicant activating a hyperlink or merely completing an entry on an application. Allowing activation of the hyperlink only after completion of the application can provide increased security or privacy for the Net Counselor by requiring the applicant to submit significant identifying information, including financial information (e.g., online payment information such as credit card information).

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3a-3g show a typical college admissions application in which the invention is implemented.

FIGS. 4 and 5 show partial NetCounselor pages that are presented to students as they complete their application.

DETAILED DESCRIPTION OF A PREFERRED EMBODIMENT

In the preferred embodiment described below, the invention is described as implemented in connection with electronic application forms for admission to a university or other institution, the forms being completed over the Internet. The invention is not limited, however, to any particular type of electronic form or computer network.

Figure 1:
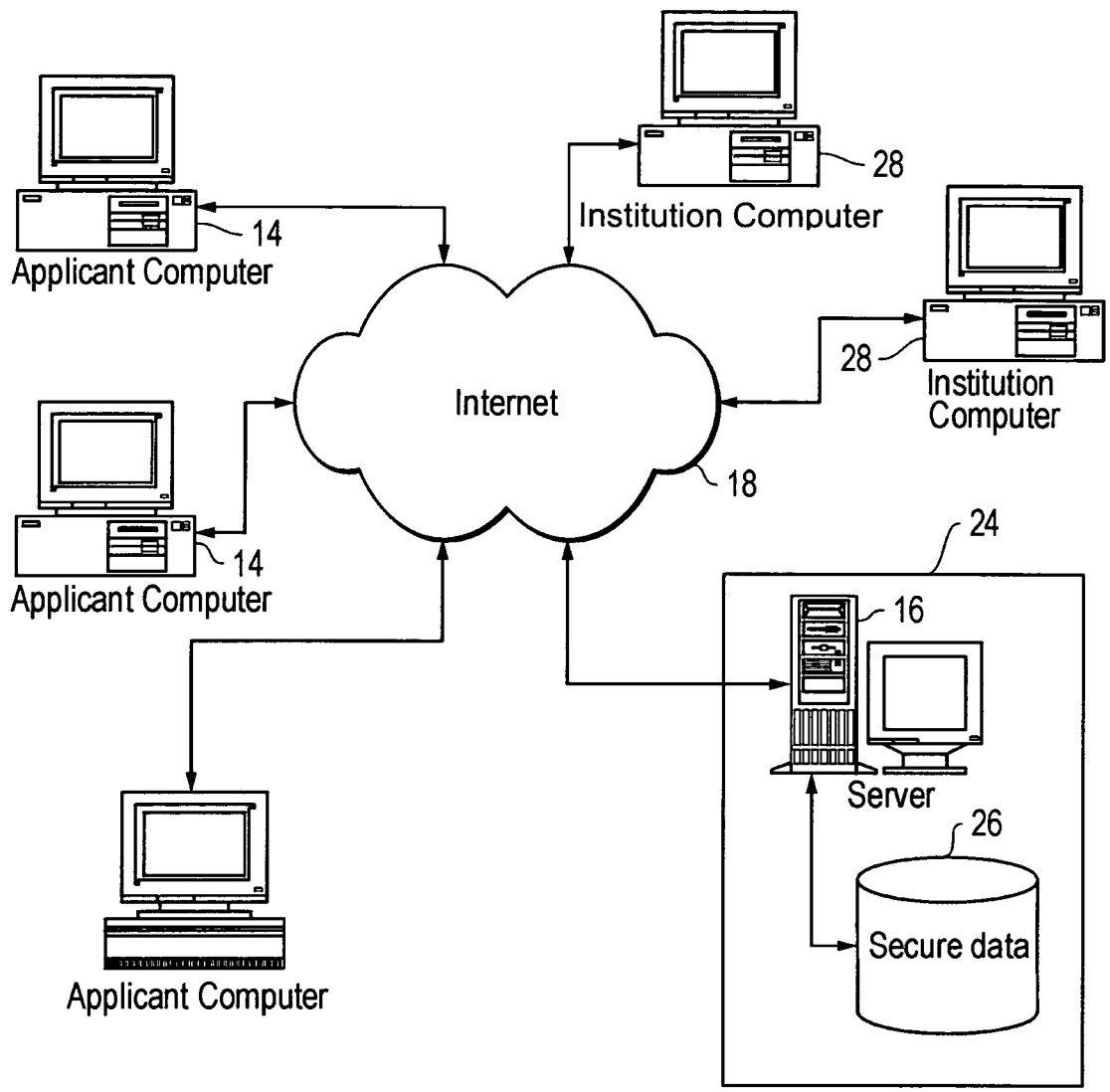
FIG. 1 shows a computer network through which applicants, a servicer, and institutions are connected in a preferred embodiment of the invention.

FIG. 1 shows an overview of the hardware supporting a preferred implementation of the invention. As shown in FIG. 1, multiple applicant computers 14 communicate with a server 16 through the portion of the Internet 18 known as the World Wide Web (the Web). A typical applicant computer 14 comprises a personal computer, such as a Pentium-based personal computer using a Windows-based operating system and running a commercially available Web Browser, such as Netscape Navigator or Internet Explorer. In a preferred embodiment, applicant computers 14 can use an older, text-based browser, because processing, such as error checking, is performed at server 16, rather than at the client browser.

Server 16 is a computer, such as a Sun Solaris UltraSparc Server, that is executing a software implementing the present invention, as well as Web server software that coordinates communications with visitors to the form engine Web site. Information and forms transferred from server 16 are typically formatted in a hypertext mark-up language (HTML) and can include text, programs, graphics, video, and audio portions. Server 16 is preferably operated by third party application servicer 24 and is connected to secure data storage 26. Multiple institution computers 28, operated by institutions, such as colleges or universities that require admissions applications, also communicate with server 16 over the Internet 18.

Although the preferred embodiment of the invention is implemented using an Internet Web site, the invention is not limited to any particular type of computer or computer network. By making the applications available over the Web, any applicant with a Web browser can apply electronically. On-line applications also allows the application fee to be processed on-line, so that credit card settlements, electronic bank withdrawals, and other payment methods can be performed more efficiently. The settlement can be easily facilitated by the third party that operates a forms engine to which multiple institutions subscribe.

Figure 2:
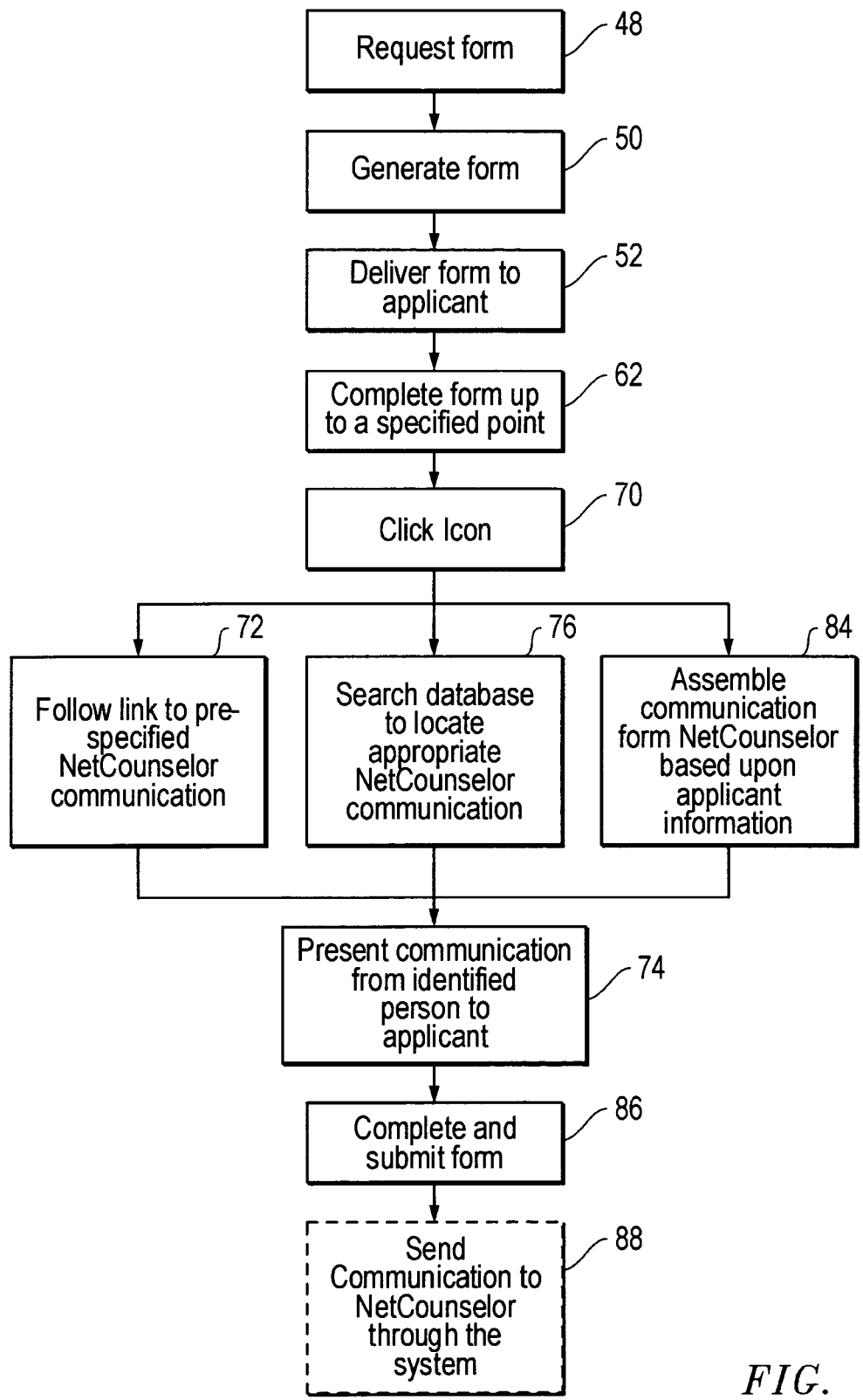
FIG. 2 is a flow chart showing the steps performed in a preferred embodiment of the present invention.

FIG. 2 shows a flow chart outlining the steps of a preferred embodiment of the present invention. In step 48, an applicant requests an electronic form, such as an admissions application form, over the Internet. The applicant can request the admissions application form from the Web site of the institution to which he is applying or from a third party servicer such as College NET Inc., as assignee of the present invention. In step 50, an application form is generated, preferably by the Universal Forms Engine, described in U.S. patent application Ser. No. 09/325,533, which is hereby incorporated by reference, operating on or from server 16 of FIG. 1. The Universal Forms Engine generates a customized electronic application form that preferably is in the same style as the institution's own web site and is branded for the institution for which the application is directed. The forms engine is preferably hosted by a third party servicer 24 to ease data sharing across institutions and electronic processing of application fees. In step 52, the application is delivered over the Internet in as an HTML page to applicant computer 14.

FIGS. 3a-3g show an admissions application 58 that is delivered to an applicant. Admissions application 58, as well as all other pages presented to the applicant, are formatted as HTML pages. Pages on which the applicant enters information use the HTML <FORM> tag. The HTML form posts information to server 16, which executes a common gateway interface (CGI) program specified by the form to process the received information. The CGI program is preferably written in Perl, C, C++, Java, or another language that supports CGI. The CGI program accesses from secure data storage 26 a database that includes information about customized application form 58 and about the applicant. The database is preferably a relational database that is accessed using a structured query language through a database management system, such as Informix®, by Informix Software, Inc., based in Menlo Park, Calif. The invention is not limited to a particular implementation technology. The implementation details of the invention are expected to change as computer technology evolves.

As shown in FIGS. 3a-3g, application 58 includes multiple data entry fields 60. In step 62, the applicant completes the form up to a specified point, such as completing a Permanent Address State/Province field 60a on FIG. 3b. After state field

60a is positioned an icon 64 in the shape of a human form. In step 70, icon 64 is activated by clicking, which results in the presentation of a communication to the applicant, the communication being about or from a real, identified person. By presenting a communication from an identified person, as opposed to impersonal information about the form or the institution, the forms completion process is made a more social, less solitary activity. This social element can have the effect of increasing the goodwill the user feels toward the institution, thereby encouraging the user to enter into a relationship with the institution.

FIG. 2 shows three different paths that could follow activation of a hyperlink, depending upon the type of hyperlink that is activated. In the first case, the same information is presented to all applicants. In step 72, the hyperlink is followed to a pre-specified communication and in step 74, the communication is presented to the applicant. Such a hyperlink, which presents the information that is not dependent on information entered into the form, is referred to as a "static" hyperlink. An appropriate use for a static hyperlink would be, for example, presenting, when the applicant clicks on an icon at the beginning of a form, a pop-up window with a Web page showing the Admissions Director congratulating the applicant for beginning the application. A static hyperlink always goes to the same page and is not contingent on the data entered by the user.

Another type of hyperlink is referred to as a "conditional hyperlink." In such a hyperlink, the communication presented upon activating the link depends upon some condition, such as the values entered by the applicant into one or more data entry fields of the form. For example, hyperlink 64, positioned after state 60a, may return different information depending upon the information entered in the Permanent Address City and State fields. Upon activation of hyperlink 64, a program checks the conditions and determines a communication to present. For example, the program compares in step 76 the information entered in the city and state fields, with address information in a database to select a message from an individual from the same state as applicant's home town. The database searched is preferably the NetCounselor database. A communication from a NetCounselor from the same state, and preferably the same city, as the applicant is then presented in a pop-up window to the applicant in step 74. FIG. 4, for example, shows a communication from Susan, a NetCounselor from Boston, that is presented to an applicant who enters Boston as his home city on the admissions application. Similarly, FIG. 5 shows a communication from Damon, a NetCounselor from Chicago, that is presented to a student who enters Chicago as his home city.

Another appropriate use for a conditional hyperlink would be, for example, after a field in which an applicant enters a major field of study, such as field 60b in FIG. 3c. In that case, a program would search the Net Counselor database to locate a NetCounselor pursuing the same major field of study as that entered by the applicant. For example, if the applicant entered chemistry as his major field of study, a student studying chemistry appears in a window, telling the applicant what a great experience it is to be learning chemistry at the institution.

Another type of hyperlink that could be used with the invention is referred to as a "dynamic" hyperlink. Whereas the conditional hyperlink typically determines which of multiple existing pages to present to the applicant, the dynamic hyperlink in step 84 assembles the content of the communication to the applicant, typically based upon the information in fields already completed by the applicant. For example, a dynamic hyperlink could assemble a customized message based on "boiler plate" material. The program that specifies or assembles the information to be presented to the applicant is preferably written in a language like JavaScript and incorporated into an HTML application form, so that most Web Browsers will be able to present the static, conditional, or dynamic NetCounselor pages to the applicant.

In some implementations, a "partial" NetCounselor page is presented to the applicant. For example, the enrolled chemistry student described above might reveal only part of his story, promising to reveal the rest or how to make contact only after the application is submitted. The pitch might be: "My name is "Beth" and I'll be happy to tell you even more about the department as soon as you complete your application. Once you're finished with your application, go the Netcounseling system and type "Beth," and you'll be able to read the rest of my story." The invention thus may provide some excitement and anticipation in the application process.

In step 86, the applicant completes and submits the form. In step 88, the applicant optionally sends a e-mail to the NetCounselor that contacted him during the application process, and asks any questions he might have related to the institution. Because the applicant has already received a communication from the NetCounselor, and, if conditional or dynamic hyperlinks were used, the applicant probably has something in common with the NetCounselor, the applicant may be more comfortable establishing contact than he would otherwise. Establishing a personal communication with a NetCounselor increases the likelihood that the applicant will attend the institution.

The present invention closely integrates the NetCounselor system into the application process. In Netcounseling, what the student sees after a search for available NetCounselors can be determined in part by (1) where that student happens to be in the application process (e.g. pre-application, application in process, or application submitted) and, (2) what that student might have typed to this point into the application. (Such entered data can be used as a kind of filter to control, for example, that French faculty are presented to applicants who have cited French as their expected major.) Yet, despite this implicit linking of the application process to the NetCounselor system, the two have not been explicitly linked in the eyes of the applicant, who was required to exit an application and perform a search to locate a NetCounselor. Netcounseling is a personalized, social, enjoyable experience; filling out an application form before the present invention was not. By integrating the NetCounselor System more directly into the application, completing the form itself becomes a personalized, social, enjoyable experience.

The implementation of FIG. 2 shows a communication being provided to an applicant in step 74 prior to completion of the form in step 86. In another implementation, icon 64 is not presented or active until after the applicant completes and submits the form. Submission of the form will typically include significant identifying information, including financial information (e.g., online payment information such as credit card information). Allowing activation of the hyperlink only after completion of the application can provide increased security or privacy for the specified person in the communication.

The hyperlinking of process steps 72, 76, and 84 are described above as providing communication from an identified person associated with the institution. The communications with identified persons associated with the institution are generally information that relates to the underlying purpose of the form being completed by the user, rather than mere assistance with the requirements or instructions for completing the form. In the illustration of conditional hyperlink 76, for example, communications from identified persons are provided in connection with completion of college admissions forms to give the user personalized information that increases the user's interest in enter into a relationship with the institution (i.e., college). The personalized information available from the identified persons relates to the underlying purpose of the admissions form (i.e., the student deciding to attend the college) rather than mere assistance with completing the form.

It will be appreciated, therefore, that such hyperlinking, and particularly the conditional and dynamic hyperlinking, can be made to forms of information that relate to the underlying purpose of the form being completed by the user but are not necessarily communications from identified users. Moreover, with respect to the conditional and dynamic hyperlinking, the information is provided parametrically according to information entered into the form by the user.

Figure 6:
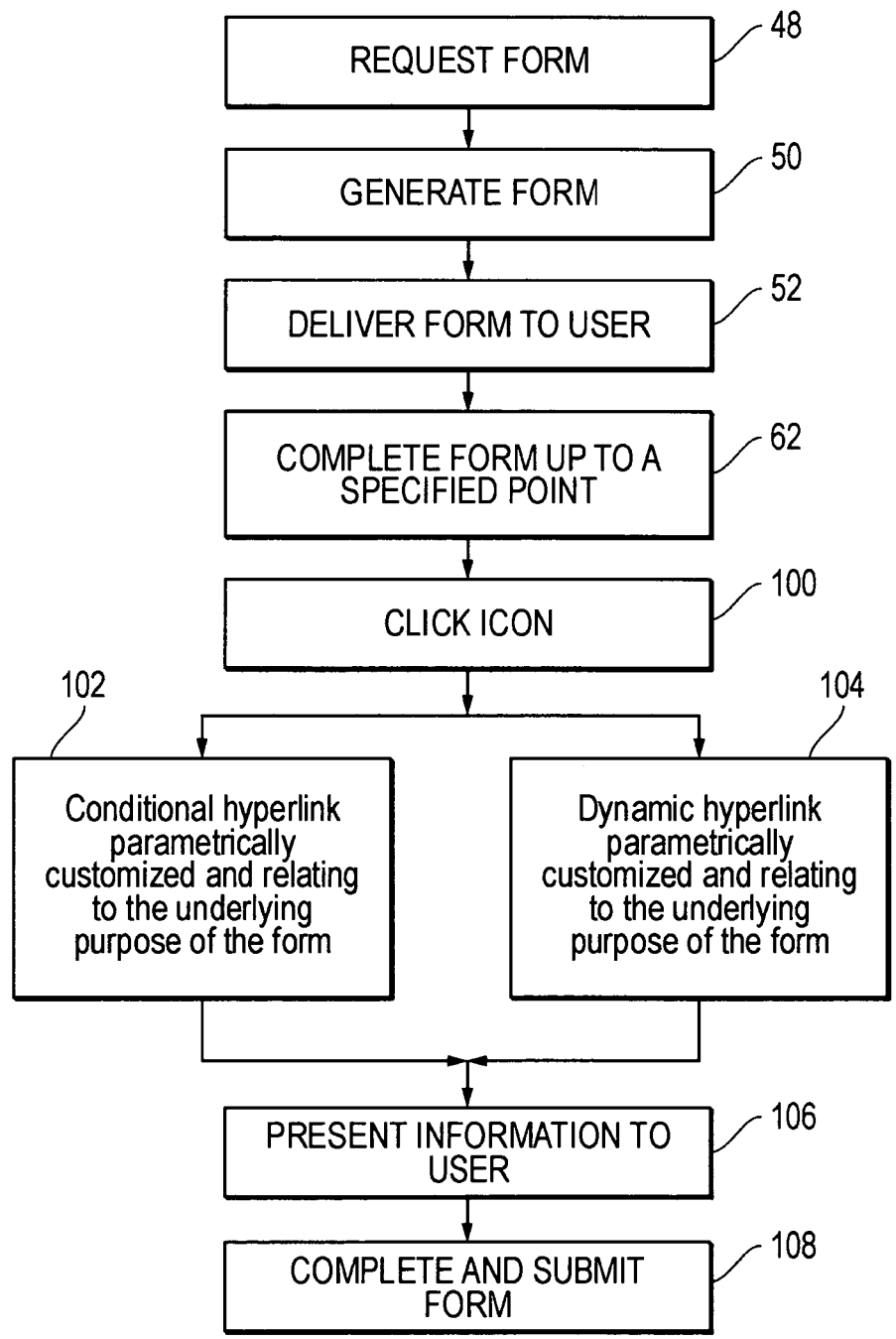
FIG. 6 is a flow chart outlining the steps of another preferred embodiment of the present invention

FIG. 6 shows a flow chart outlining the steps of another preferred embodiment of the present invention. Steps 48-62 of FIG. 6 are analogous to the corresponding steps described above with reference to FIG. 2. In step 62, the applicant completes the form up to a specified point, after which is positioned an icon (not shown) that indicates a hyperlink that is selectable by the user. In step 100, the hyperlink is activated by clicking the icon, which results in the presentation of information that relates to the underlying purpose of the form being completed by the user and is parametric according to information entered into the form by the user. FIG. 6 shows two different paths that could follow activation of a hyperlink, depending upon the type of hyperlink that is activated.

Step 102 refers to a conditional hyperlink in which the information provided to the user depends upon some condition, such as the values entered by the applicant into one or more data entry fields of the form, and relates to the underlying purpose of the form. In one example of a college admissions form, the information could relate to a scholarship or other financial assistance potentially available to the user based upon information entered by the user into the form (e.g., parents' alumni status, financial assistance based upon geographic residence, etc.). In another example of a college admission form, the information (e.g., text descriptions, still or motion images, or virtual reality or panning images) could relate to particular college facilities (e.g., sports) based upon interest information entered by the user. Such information, like communications from specified persons, is parametrically personalized or customized and relate to the underlying purpose of the form (e.g., forming a relationship between the user and the institution sponsoring the form).

The conditional hyperlink of step 102 typically determines which of multiple existing pages to present to the user. Step 104 refers to a dynamic hyperlink in which the content of the information provided to the user is assembled based upon the information in fields already completed by the applicant. For example, a dynamic hyperlink could assemble a customized collection of information for the user, the information potentially relating to multiple topics (e.g., financial assistance, user interests, housing accommodations, etc.) that is parametrically personalized or customized and relate to the underlying purpose of the form. For example, a user could indicate in a college admission application form that he is a National Merit Scholar planning to major in mathematics and interested in soccer, among other things. The dynamic hyperlink could consolidate information about National Merit Scholars at the college, information about the mathematics department, and a still or motion image of the soccer facilities (e.g., a 360 degree image of the soccer stadium). Steps 106 refers to the information associated with a hyperlink in step 102 or 104 is resented to the user. In step 108, the user completes and submits the form.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method of receiving a college or university admissions application from a college or university applicant over a computer network, the method comprising:

receiving a request for a college or university admissions application from a college or university applicant, the request being communicated over a computer network;

in response to receiving the request for a college or university admissions application from a college or university applicant, generating the college or university admissions application, said college or university admissions application comprising an electronic form having a plurality of data entry fields for entering college or university admissions data;

transmitting the college or university admissions application to the college or university applicant, the transmission being communicated over the computer network;

receiving college or university admissions data from the college or university applicant, the college or university admissions data being entered into the data entry fields of the college or university admissions application by the college or university applicant; and detecting a selection of a user-selectable hyperlink by the college or university applicant, the indication being communicated over the computer network;

in response to detecting of the selection of the hyperlink:

analyzing the college or university admissions data received from the college or university applicant to determine one or more interests of the college or university applicant;

selecting a communication based on the one or more interests of the college or university applicant, the communication being about or from a real, identified person;

transmitting the selected communication to the college or university applicant;

in which the identified person is a student enrolled in or attending the college or university to which the college or university applicant is applying for admission; and in which the communication from the identified person includes a message of encouragement for the college or university applicant and an invitation to contact the identified person after completing the electronic form.

2. The method of claim 1, in which a universal forms engine generates the college or university admissions application.

3. The method of claim 2, in which the universal forms engine is hosted by a third party servicer.

4. The method of claim 1, in which the computer network is the world-wide-web, the college or university admissions application is a world-wide-web page, and the communication is a world-wide-web page.

5. The method of claim 1, in which the hyperlink is displayed to the college or university applicant in response to receiving a predetermined threshold of college or university admissions data from the college or university applicant.

6. The method of claim 1, in which detecting the selection of the hyperlink causes the content of the communication to the applicant to be assembled based upon the college or university admissions data already completed by the applicant.

7. The method of claim 1, in which detecting the selection of the hyperlink causes a communication from a NetCounselor to be selected based upon the college or university admissions data already completed by the applicant.

8. A system for receiving a college or university admissions application from a college or university applicant over a computer network, the system comprising:
   a computer processor coupled;
   a computer network interface coupled to the computer processor and a computer network;
   a non-transitory computer-readable medium coupled to the computer processor, the computer-readable medium encoded with computer-executable instructions that, when executed by the computer processor, cause the computer processor to perform the steps of:
      receiving a request for a college or university admissions application from a college or university applicant, the request being communicated over the computer network;
      in response to receiving the request for a college or university admissions application from a college or university applicant, generating the college or university admissions application, said college or university admissions application comprising an electronic form having a plurality of data entry fields for entering college or university admissions data;
      transmitting the college or university admissions application to the college or university applicant, the transmission being communicated over the computer network;
      receiving college or university admissions data from the college or university applicant, the college or university admissions data being entered into the data entry fields of the college or university admissions application by the college or university applicant; and
      detecting a selection of a user-selectable hyperlink by the college or university applicant, the indication being communicated over the computer network;
      in response to detecting of the selection of the hyperlink:
         analyzing the college or university admissions data received from the college or university applicant to determine one or more interests of the college or university applicant;
         selecting a communication based on the one or more interests of the college or university applicant, the communication being about or from a real, identified person; and
         transmitting the selected communication to the college or university applicant;
         in which the identified person is a student enrolled in or attending the college or university to which the college or university applicant is applying for admission; and
         in which the communication from the identified person includes a message of encouragement for the college or university applicant and an invitation to contact the identified person after completing the electronic form.

9. The system of claim 8, in which a universal forms engine generates the college or university admissions application.

10. The system of claim 9, in which the universal forms engine is hosted by a third party servicer.

11. The system of claim 8, in which the computer network is the world-wide-web, the college or university admissions application is a world-wide-web page, and the communication is a world-wide-web page.

12. The system of claim 8, in which the hyperlink is displayed to the college or university applicant in response to receiving a predetermined threshold of college or university admissions data from the college or university applicant.

13. The system of claim 8, in which detecting the selection of the hyperlink causes the content of the communication to the applicant to be assembled based upon the college or university admissions data already completed by the applicant.

14. The system of claim 8, in which detecting the selection of the hyperlink causes a communication from a NetCounselor to be selected based upon the college or university admissions data already completed by the applicant.

15. A computer program product for receiving a college or university admissions application from a college or university applicant over a computer network, the computer program product comprising a non-transitory computer readable medium encoded with computer-executable instructions that, when executed by a computer processor, cause the computer processor to perform the steps of:
   receiving a request for a college or university admissions application from a college or university applicant, the request being communicated over a computer network;
   in response to receiving the request for a college or university admissions application from a college or university applicant, generating the college or university admissions application, said college or university admissions application comprising an electronic form having a plurality of data entry fields for entering college or university admissions data;
   transmitting the college or university admissions application to the college or university applicant, the transmission being communicated over the computer network;
   receiving college or university admissions data from the college or university applicant, the college or university admissions data being entered into the data entry fields of the college or university admissions application by the college or university applicant; and
   detecting a selection of a user-selectable hyperlink by the college or university applicant, the indication being communicated over the computer network;
   in response to detecting of the selection of the hyperlink:
      analyzing the college or university admissions data received from the college or university applicant to determine one or more interests of the college or university applicant;
      selecting a communication based on the one or more interests of the college or university applicant, the communication being about or from a real, identified person; and transmitting the selected communication to the college or university applicant;

in which the identified person is a student enrolled in or attending the college or university to which the college or university applicant is applying for admission; and in which the communication from the identified person includes a message of encouragement for the college or university applicant and an invitation to contact the identified person after completing the electronic form.

16. The computer program product of claim 15, in which a universal forms engine generates the college or university admissions application.

17. The computer program product of claim 16, in which the universal forms engine is hosted by a third party servicer.

18. The computer program product of claim 15, in which the computer network is the world-wide-web, the college or university admissions application is a world-wide-web page, and the communication is a world-wide-web page.

19. The computer program product of claim 15, in which the hyperlink is displayed to the college or university applicant in response to receiving a predetermined threshold of college or university admissions data from the college or university applicant.

20. The computer program product of claim 15, in which detecting the selection of the hyperlink causes the content of the communication to the applicant to be assembled based upon the college or university admissions data already completed by the applicant.

21. The computer program product of claim 15, in which detecting the selection of the hyperlink causes a communication from a NetCounselor to be selected based upon the college or university admissions data already completed by the applicant.

\* \* \* \* \*